June 15, 1948. E. D. FOULKS 2,443,186
JET PROPULSION FUEL FEEDING AND EXHAUST CONTROL DEVICE
Filed Jan. 3, 1944 2 Sheets-Sheet 1

Inventor
Edwin David Foulks.
Attorney

June 15, 1948.　　　　E. D. FOULKS　　　　2,443,186
JET PROPULSION FUEL FEEDING AND EXHAUST CONTROL DEVICE
Filed Jan. 3, 1944　　　　　　　　　　　　2 Sheets-Sheet 2
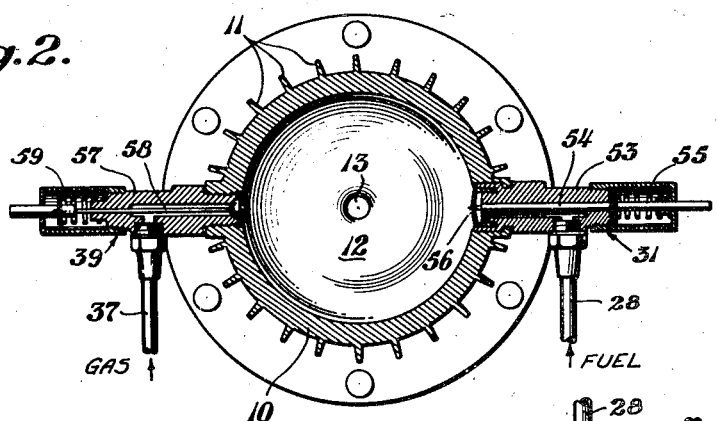
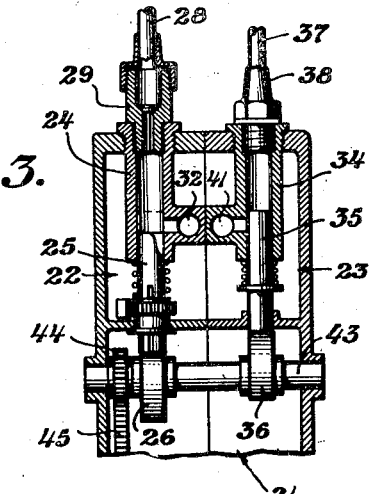
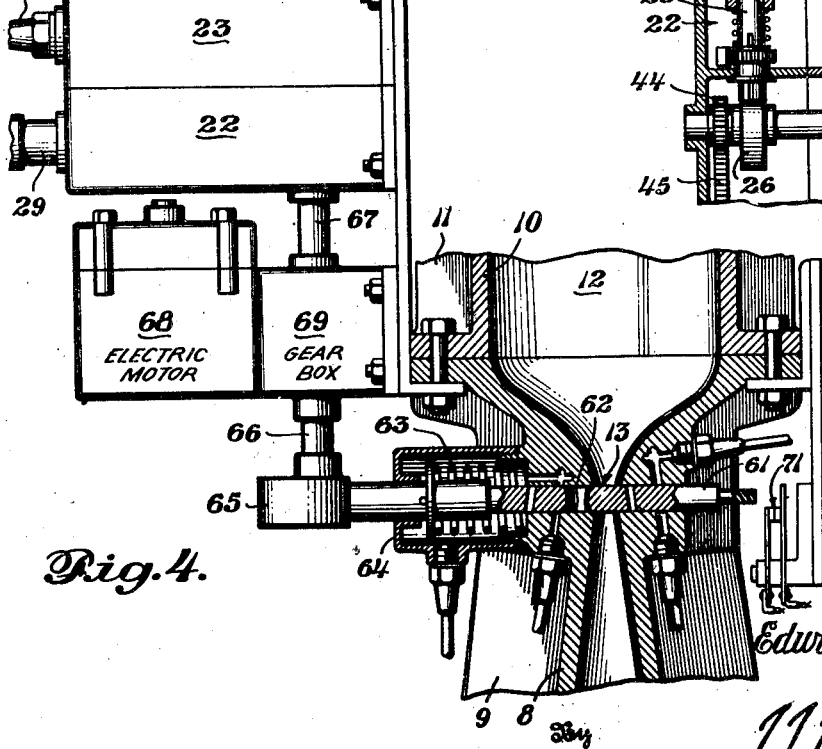

Patented June 15, 1948

2,443,186

UNITED STATES PATENT OFFICE 2,443,186

JET PROPULSION FUEL FEEDING AND EXHAUST CONTROL DEVICE

Edwin David Foulks, United States Navy

Application January 3, 1944, Serial No. 516,867

1 Claim. (Cl. 60—35.6)

(Granted under the act of March 3, 1883, as amended April 30, 1928; 370 O. G. 757)

This invention relates to internal combustion engines and more particularly to engines of the jet propulsion or rocket type operating on an intermittent combustion cycle in which propulsion is derived from the cyclic explosive force of gases which are ignited in a combustion chamber and then expelled rearwardly of the engine to produce a forward propelling force.

Jet propulsion engines of the type operating on an intermittent combustion cycle generally include a combustion chamber having an exhaust port or outlet which opens rearwardly of the engine. Fuel such as gasoline, and an oxidizing gas such as oxygen or nitrogen dioxide, if desired, of a predetermined amount are admitted to the combustion chamber while the exhaust port is closed and the mixture builds up a pressure within the chamber. This mixture is then fired by any suitable means such as a spark plug. Simultaneously with the explosion of the mixture, the exhaust port is opened and the gases are expelled rearwardly of the engine. The reaction of these gases against the nozzle of the engine produces a forward propelling force. The exhaust port is then closed and the cycle repeated.

An object of this invention is to provide a novel and improved construction for the exhaust port mechanism of this type engine.

Another object is to provide a novel and improved arrangement for coupling the fuel and gas admission means with the exhaust port mechanism so that all operate in a fixed cycle.

Yet another object is to provide a novel construction for a gas admission valve and control valve system for admitting an oxidizing gas in conjunction with the admission of fuel into the combustion chamber of an internal combustion engine.

Other objects and advantages will become apparent from the following detailed description and accompanying drawings which describe and illustrate preferred embodiments of the invention.

Fig. 2 is a transverse sectional view taken through the top of the cylinder at 2—2 in Fig. 1 showing details of the fuel and gas admission valves to the combustion chamber;

Fig. 3 is a vertical section showing details of the fuel pump and gas control means; and Fig. 4 is a fragmentary view similar to Fig. 1, illustrating a modified exhaust port construction and control.

Figure 1:
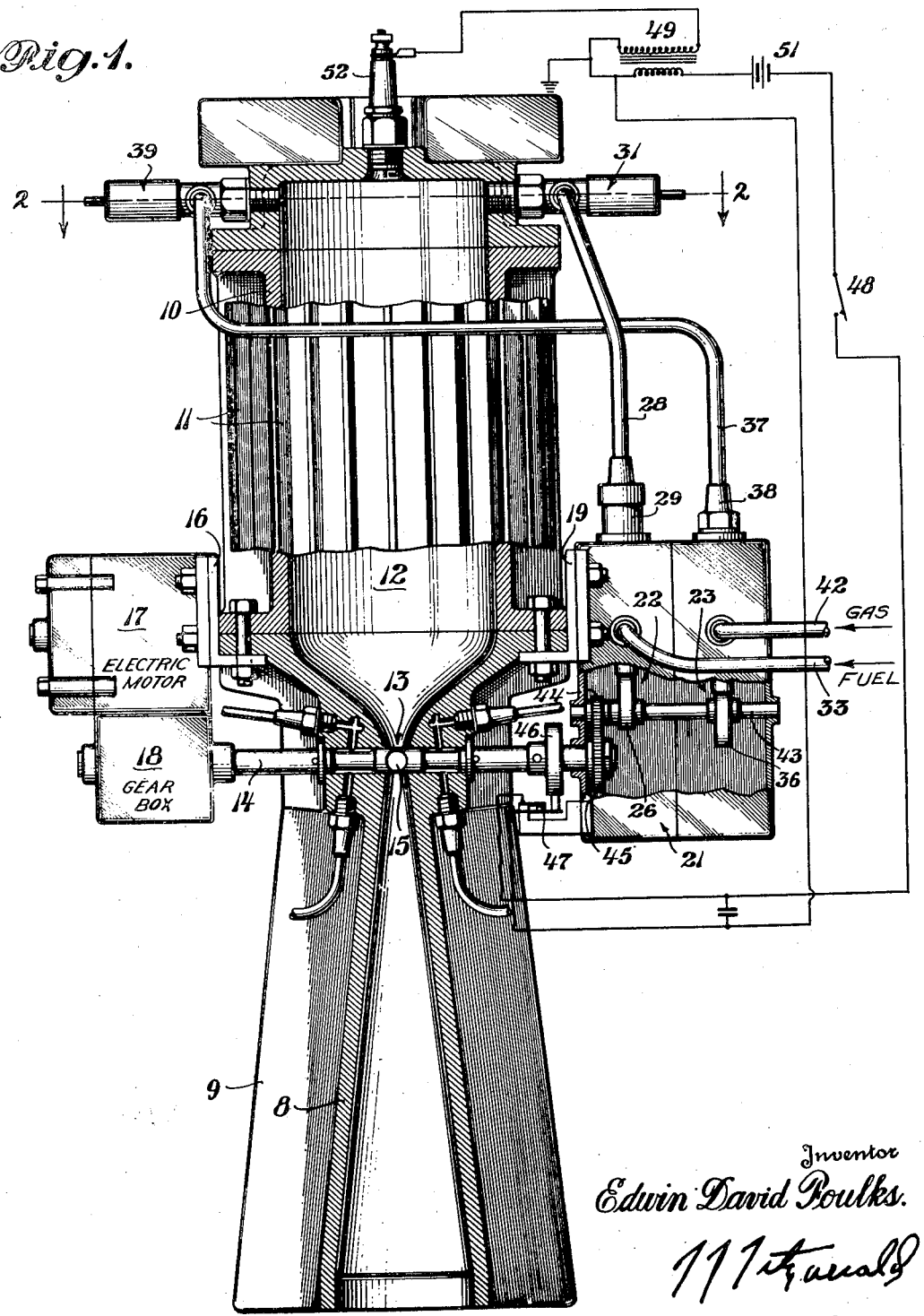
Fig. 1 is a longitudinal view partly in section showing one preferred embodiment of a single cylinder jet propulsion engine incorporating features of the invention.

Referring now to the drawings and in particular to Figs. 1, 2 and 3, my improved engine consists of a cylinder 10 which may include a plurality of fins 11 extending outwardly therefrom to increase cooling. The inside of the cylinder 10 serves as a combustion chamber 12, and lower end of which may be made as a separate part and which converges into an exhaust port or outlet 13. A shaft 14 extends transversely of the port 13 and is provided with an opening 15 therethrough which is of substantially the same size as the port 13. Thus as the shaft 14 is rotated, port 13 will be opened twice in each revolution thereof. Port 13 leads to an expansion nozzle 8 which may be provided with cooling fins 9.

To the lower left side of cylinder 10 is fastened an L-shaped bracket 16 and to this bracket is fastened an electric motor 17 which is coupled through gear box 18 to the shaft 14.

To the lower right side of cylinder 10 is fastened another L-shaped bracket 19 and to this bracket is secured a casing 21 which houses a fuel injection pump 22 and an oxidizing gas admission valve assembly 23.

The fuel pump 22, some of the construction details of which are shown in both Figs. 1 and 3, includes a cylinder 24 and a piston 25 which is reciprocated therein by means of a cam 26. A pipe line 28 is connected to the upper end of cylinder 24 by a coupling 29 and feeds the fuel from the discharge end of the pump 22 to the fuel admission valve 31 on the cylinder 10 which valve will be later described in more detail. The fuel intake to the pump 22 comprises an inlet port 32 which communicates with pump cylinder 24. Fuel is led to port 32 by a pipe line 33 which connects with a fuel tank (not shown).

The gas admission valve assembly 23 which occupies the other part of the common casing 21 is also shown clearly in Figs. 1 and 3 and comprises a valve cylinder 34 and valve piston 35 which is reciprocated therein by means of a cam 36. A pipe line 37 is connected to the upper end of cylinder 34 by a coupling 38 and feeds pressurized gas such as oxygen to the gas admission inlet valve 39 on the cylinder 10, which valve means will also be later described in more detail. The gas inlet to cylinder 34 is by means of an inlet port 41 which connects via pipe line 42 with a source of gas which may be contained under high pressure in a tank or bottle (not shown).

As shown in Fig. 1, cams 26 and 36, the lobes of which are substantially 180° apart, are carried by a stub shaft 43 which is suitably journaled in the side walls of casing 21. Shaft 43 is coupled to shaft 14 by means of gears 44 and 45, the gear ratio being such that stub shaft 43 makes two revolutions for each revolution of shaft 14.

Also rotatable with shaft 14 is another cam 46 which is adapted to separate breaker points 47 which are connected in circuit with the ignition system utilized for firing the charge in chamber 12. While many different kinds of ignition systems may be used, the one illustrated schematically is conventional and comprises an ignition switch 48, induction coil 49, battery 51 and spark plug 52. As the cam 46 rotates, points 47 will be broken causing a very high voltage to be induced in the secondary side of coil 49. This voltage is impressed on the spark plug 52 causing it to fire. Cam 46 has two lobes spaced 180° apart which means that the plug 52 will be caused to fire twice in each revolution of shaft 14.

Referring now to Fig. 2, the fuel admission valve 31 comprises a valve casing 53 which threads into the upper end of cylinder 10 and communicates with the combustion chamber 12. Within casing 53 is a valve stem 54 which is biased to the left (or closed position for the valve) by means of spring 55. However, when fuel is forced up through pipe line 28 from pump 22, the pressure of the fluid upon the end of valve stem 54 will move the latter from its seat 56 to the right thus permitting a limited amount of fuel to be forced into combustion chamber.

Also referring to Fig. 2, the gas inlet valve 39 on cylinder 10 comprises a valve casing 57 and a valve stem 58 of the poppet type which reciprocates therein. Stem 58 is biased to the left (or closed position of the valve) by means of a spring 59. However, when gas is forced under pressure from the assembly 23 through pipe line 37, the pressure of this gas on the underside of the head of valve stem 58 causes the latter to open thereby admitting a predetermined charge of gas into the combustion chamber 12.

*Operation*

The operating cycle of the engine shown in Fig. 1 is as follows:

With the operating parts in the position shown, it will be noted that the opening 15 in shaft 14 is 90° away from an alignment with the exhaust port 13 of combustion chamber 12. Thus the latter is closed. At this time, piston 25 of fuel pump 22 is at its topmost position having thus injected a charge of fuel into the chamber 12. Also at this time, valve piston 35 in valve cylinder 34 will be at its lowermost position, in which position, gas can flow from supply line 42 through inlet port 41 into valve cylinder 34 and out through pipe line 37 into valve 39 and through the latter into chamber 12.

Thus with the chamber 12 closed by shaft 14, a mixture of gas and fuel builds up under pressure within the chamber.

Now as shaft 14 rotates a quarter turn bringing the opening 15 into alignment with the exhaust port 13, one of the two lobes on cam 46 separates the breaker points 47 causing plug 52 to fire and ignite the charge in the chamber 12. The reaction of the exploding gases as they are expelled outwardly through port 13 and opening in shaft 15 against the nozzle 8 produces a forward propulsion thrust to the engine. As the shaft 14 rotates further, the port 13 closes and the input phase of the cycle is repeated.

With the arrangement in Fig. 1, the opening 15 in shaft 14 aligns itself with port 13 every half turn. Thus there are two complete firing cycles for each revolution of shaft 14. As already explained, this is provided for by rotating stub shaft 43 twice as fast as shaft 14 and using a double lobed ignition cam 46.

A modified structure is shown in Figs. 3 and 4. The structure is somewhat similar to that previously described and consequently like reference characters have been used to designate like parts.

Referring now to Figs. 3 and 4, the exhaust port arrangement comprises a shaft 61 which extends transversely of the port 13 and is provided with an opening 62 which is of the same size as the port 13. Shaft 61 is biased to the left or closed position of the port 13 by means of a spring 63. The left end of shaft 61 protrudes through a housing 64 and is reciprocated by means of a cam 65 which is rotated by shaft 66 to cyclically open port 13 to the atmosphere.

The gas admission valve assembly 23 and fuel pump 22 shown in detail in Fig. 3, are similar in construction to those shown in Fig. 1. Cams 26 and 36 are mounted on shaft 43 and the latter is rotated by a shaft 67, the latter being coupled to shaft 43 by meshed pinions 44 and 45 which have the same number of teeth. Shafts 66 and 67 (which may be combined into a single shaft if desired are rotated by means of motor 68 and intermediate gear box 69. Breaker points 71 of the ignition system are operated as shaft 61 is reciprocated.

The operation of the structure in Fig. 4 is somewhat similar to that of Fig. 1. However, in the arrangement of Fig. 4, shafts 66 and 67 rotate in a 1 to 1 ratio so that for each reciprocating stroke of shaft 61, the fuel pump 22 and gas admission valve assembly 23 will operate to inject a charge of fuel and oxidizing gas into chamber 12 where it is ignited as the spark plug is fired.

In conclusion, it will be understood that while the aforesaid embodiments of the invention which have been described are to be preferred, changes in the specific structure of the elements thereof and their arrangement may be made by those skilled in the art without departing from the spirit and scope of the appended claim.

The invention described herein may be manufactured and used by or for the Government of the United States of America for governmental purposes without the payment of any royalties thereon or therefor.

Having thus fully described my invention, I claim:

In a jet propulsion engine, the combination comprising: a combustion chamber, said chamber including a Venturi-shaped exhaust port, a reciprocating shaft extending transversely of said port at the throat thereof, said shaft including a curved-wall port shaped to conform to the passage contours of said Venturi-shaped exhaust port when the exhaust port is open, said shaft port being arranged to cyclically register with and open said exhaust port as said shaft is reciprocated, a fuel pump for injecting fuel into said combustion chamber, said pump including a pump cylinder having fuel inlet and outlet means and a piston reciprocable within said cylinder to pump fuel through said outlet means, a fuel valve opening into said combustion chamber, a fuel conduit connecting said fuel valve with the fuel outlet on said pump, a gas admission valve assembly including a gas cylinder having gas inlet and outlet means and a piston reciprocable within said gas cylinder to control the flow of gas between the gas inlet and outlet means, a gas valve opening into said combustion chamber, a gas conduit connecting said gas valve with the gas outlet means of said assembly, auxiliary power means for reciprocating said port shaft, a cam shaft for actuating the pistons of said fuel pump and gas admission valve assembly, said cam shaft including lobes spaced substantially 180° apart so that said fuel pump inlet will be open while said gas inlet is closed, and vice versa, said cam shaft being operable in timed relation with reciprocation of said first-named shaft for actuating said pistons whereby a charge of fuel and gas may be admitted to said combustion chamber when the exhaust port thereof is closed by said shafts.

EDWIN DAVID FOULKS.

REFERENCES CITED

The following references are of record in the file of this patent:

UNITED STATES PATENTS

| Number | Name | Date |
| --- | --- | --- |
| 1,062,099 | Hoglund | May 20, 1913 |
| 1,083,943 | Raclot et al. | Jan. 13, 1914 |
| 1,176,207 | Dempsey | Mar. 21, 1916 |
| 1,298,430 | Wondra | Mar. 25, 1919 |
| 1,814,762 | Mochel | July 14, 1931 |
| 1,867,917 | Larson | July 19, 1932 |
| 1,980,266 | Goddard | Nov. 13, 1934 |
| 1,991,390 | Holzwarth | Feb. 19, 1935 |

FOREIGN PATENTS

| Number | Country | Date |
| --- | --- | --- |
| 5,615 | Great Britain | Mar. 11, 1903 |
| 203,828 | Great Britain | Sept. 20, 1923 |
| 390,256 | France | July 23, 1908 |
| 641,739 | France | Apr. 23, 1928 |
| 689,061 | France | May 20, 1930 |
| 695,180 | Germany | Aug. 19, 1940 |
| 305,188 | Italy | Jan. 30, 1933 |